Figure 1:
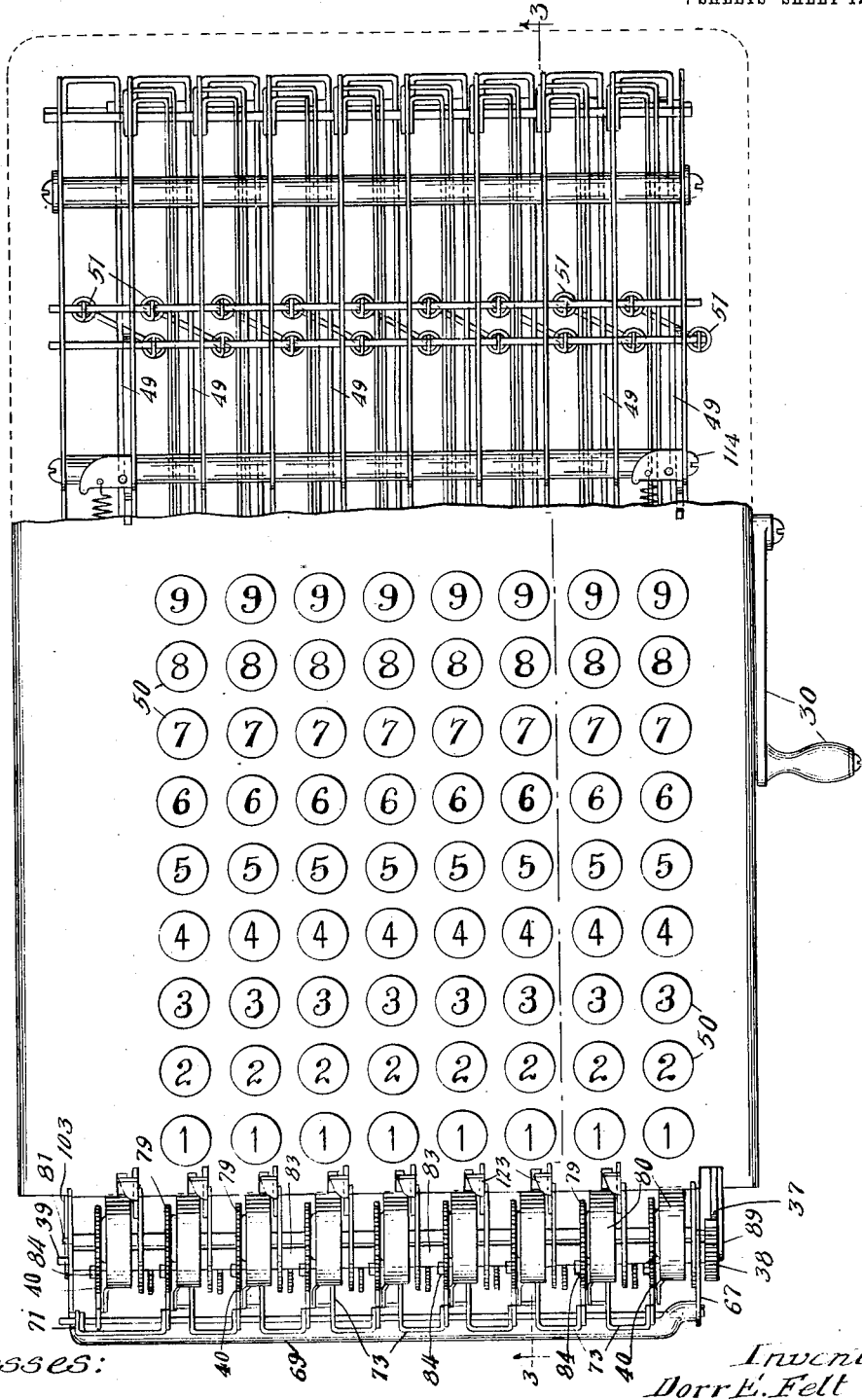

D. E. FELT.
CALCULATING MACHINE.
APPLICATION FILED SEPT. 16, 1908.

960,528.

Patented June 7, 1910.
7 SHEETS—SHEET 1.

Witnesses:
Wm. Geiger

Inventor
Dorr E. Felt
By Munday, Evarts, Adcock & Clarke.
Attorneys

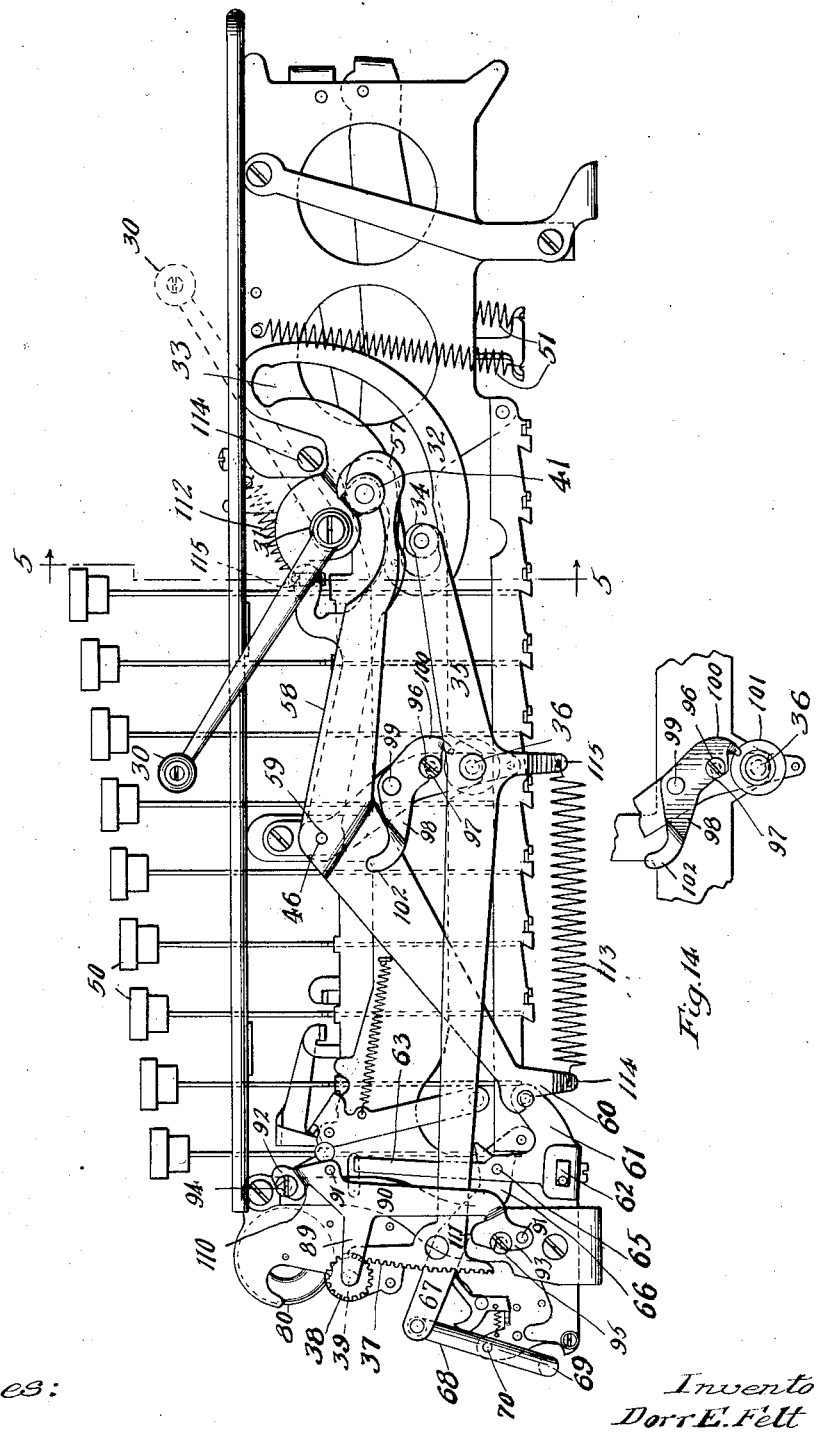

D. E. FELT.
CALCULATING MACHINE.
APPLICATION FILED SEPT. 19, 1908.
960,528.
Patented June 7, 1910
7 SHEETS—SHEET 3.
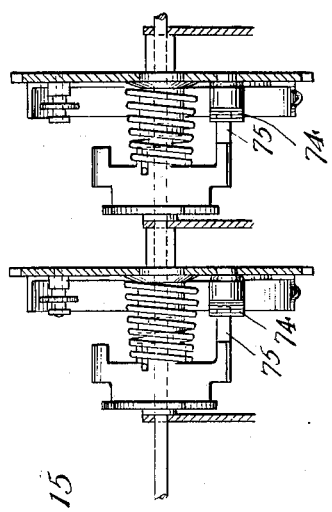
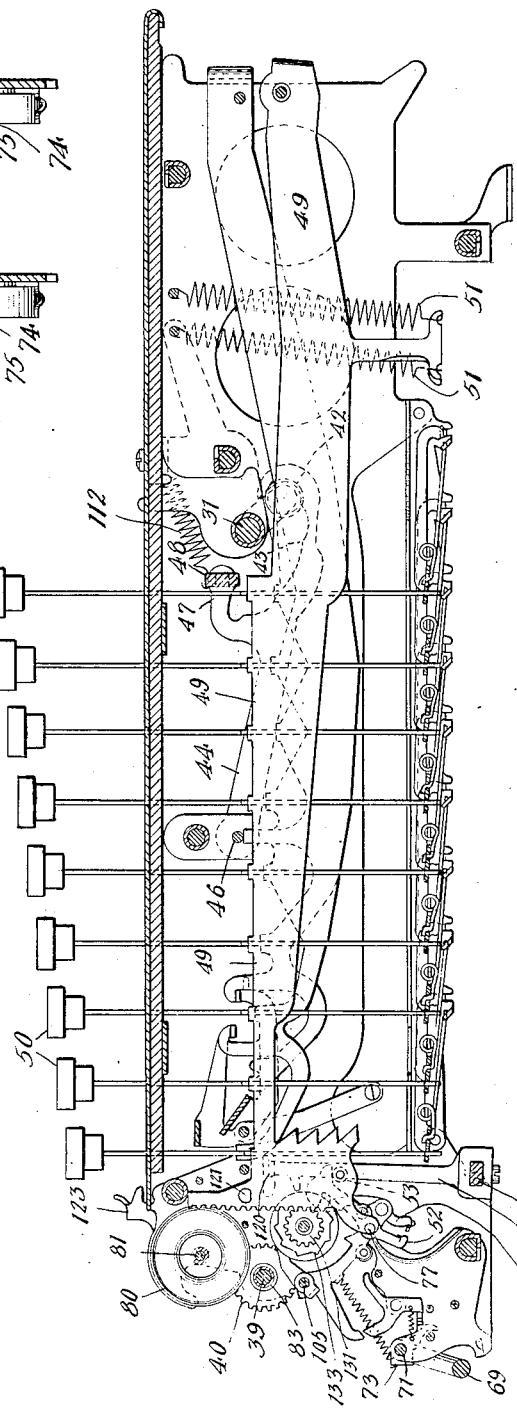
Witnesses:
Wm. Geiger
H. W. Munday
Inventor:
Dorr E. Felt
By Munday, Evarts, Adcock & Clarke.
Attorneys

D. E. FELT.
CALCULATING MACHINE.
APPLICATION FILED SEPT. 16, 1908.

960,528.

Patented June 7, 1910.

7 SHEETS—SHEET 4.

Witnesses:
Wm. Geiger
N. W. Mundy

Inventor:
Dorr E. Felt
By Munday, Evarts, Adcock & Clarke
Attorneys

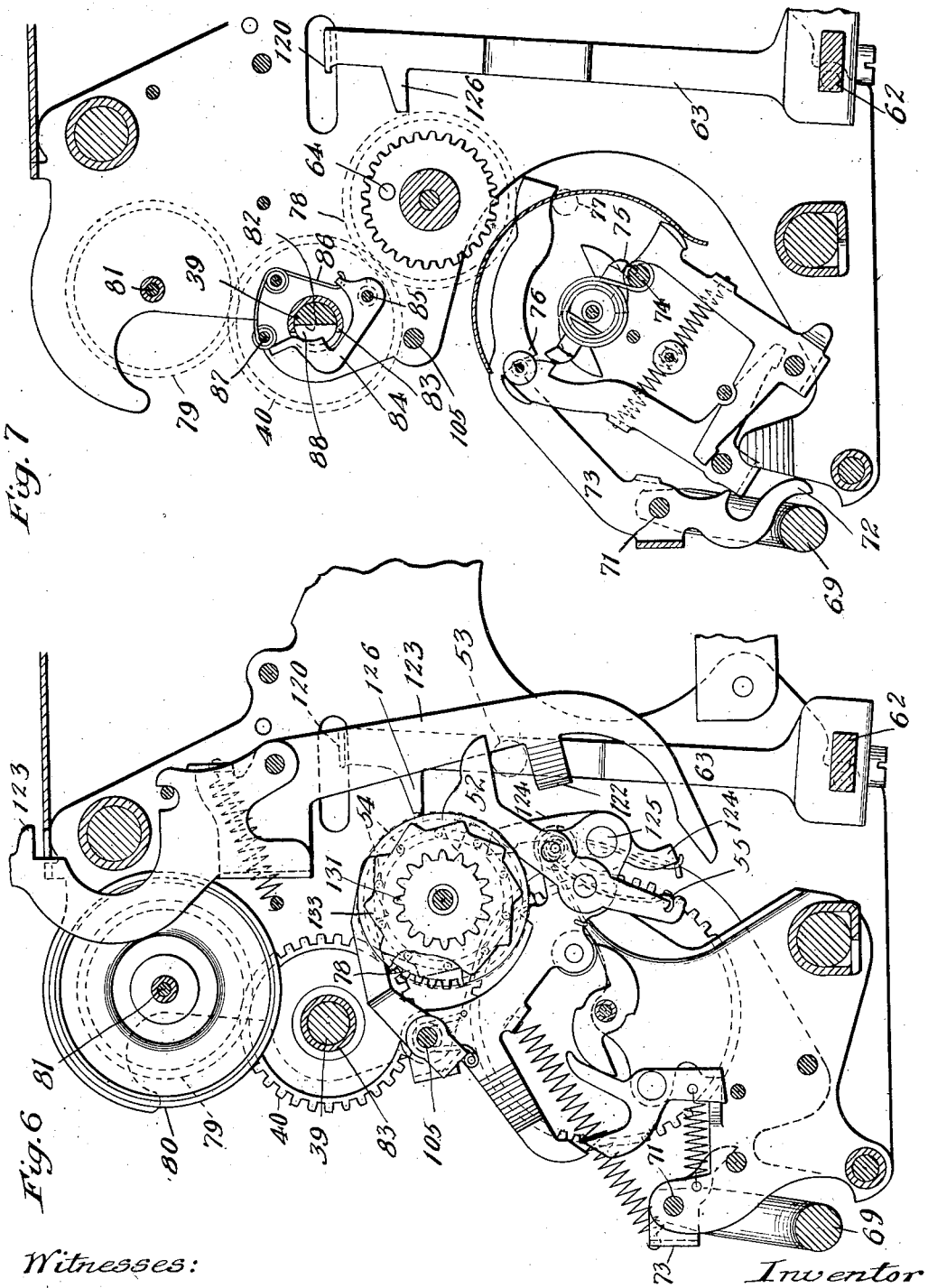

D. E. FELT.
CALCULATING MACHINE.
APPLICATION FILED SEPT. 16, 1908.
960,528.
Patented June 7, 1910.
7 SHEETS—SHEET 6.
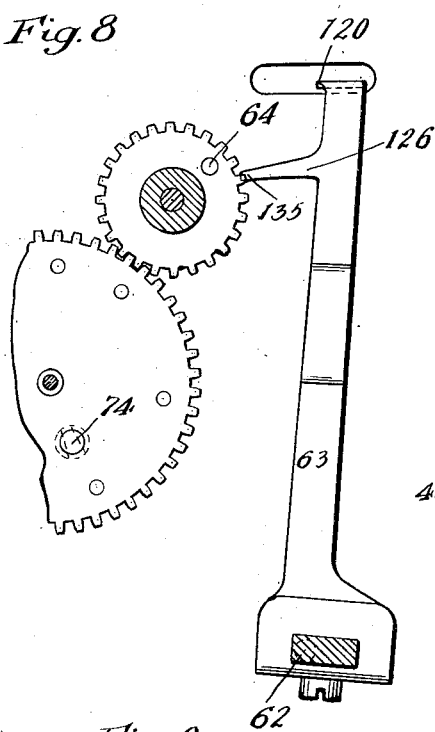
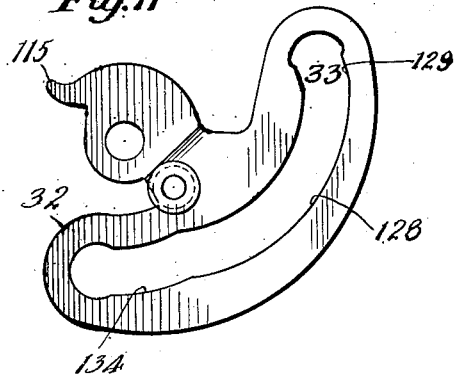
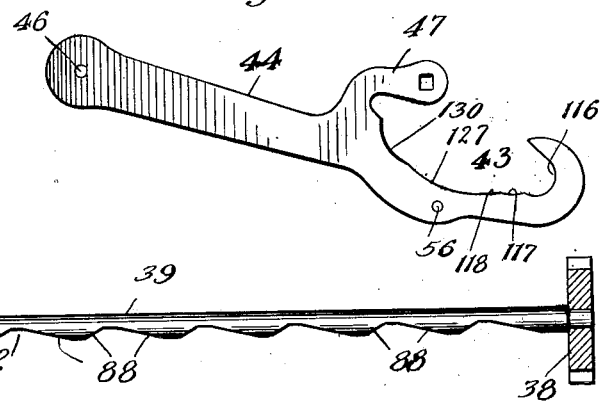
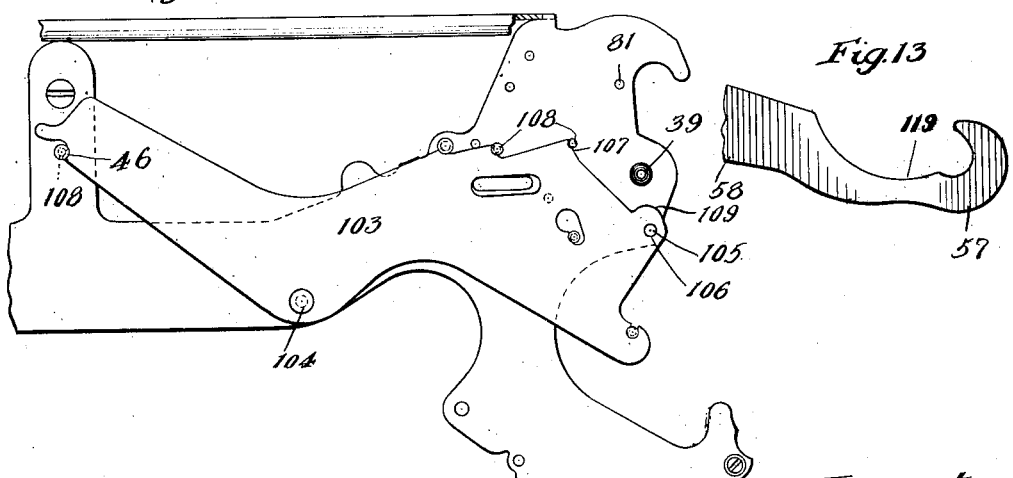
Witnesses:
Wm. Geiger
H. W. Murray
Inventor:
Dorr E. Felt
By Munday, Evarts, Adcock & Clarke.
Attorneys

D. E. FELT.
CALCULATING MACHINE.
APPLICATION FILED SEPT. 16, 1908.

960,528.

Patented June 7, 1910.
7 SHEETS—SHEET 7.

Witnesses:
Wm. Geiger
H. M. Munday

Inventor:
Dorr E. Felt
By Munday, Evarts, Adcock & Clarke.
Attorneys

UNITED STATES PATENT OFFICE.

DORR E. FELT, OF CHICAGO, ILLINOIS.

CALCULATING-MACHINE.

960,528.   Specification of Letters Patent.   Patented June 7, 1910.

Application filed September 16, 1908. Serial No. 453,271.

*To all whom it may concern:*

Be it known that I, DORR E. FELT, a citizen of the United States, residing in Chicago, in the county of Cook and State of Illinois, have invented a new and useful Improvement in Calculating-Machines, of which the following is a specification.

My invention relates to a multiple-order keyboard calculating machine, and more especially to key-driven machines of the general type of the well-known "comptometer", in whose manufacture and marketing I have been extensively engaged for many years and whose general character is shown in various of the earlier patents issued to me, as, for instance, No. 366,945 of July 19th, 1887, and in the several recent patents issued to me, Nos. 762,520 and 762,521, of June 29th, 1904, and 767,107, of August 9th, 1904, which three latter patents show the "Duplex" comptometer that I have more recently manufactured and marketed.

The drawings hereinafter described show the embodiment taken by my present invention when applied to the "Duplex comptometer" set forth in my three recent patents last above named.

My invention has for an object the production of a canceling mechanism that shall minimize the noise or jar incident upon the canceling operation and at the same time so lighten the action and reduce the resistances as to permit the operator to move the canceling actuator with the greatest possible speed and least possible effort. And the invention has for a further object the provision of entirely positive mechanism, which may be automatically operable by the canceling actuator, to release the carrying mechanism of a duplex comptometer from any surplus strain, tending to jam or lock the machine, that may have resulted from an accidentally or intentionally improper manipulation of the keys or numeral wheels, such, for instance, as holding a key depressed or a numeral wheel immovable and then making many repeated, and obviously useless, rotations of any numeral wheel or wheels of lower order, said idle rotations having the effect of accumulating so much surplus tension upon the carrying-gear as to make it jam and hold latched the carrying latch in the carrying mechanism that normally transmits carrying impulses to the numeral wheel or wheels that may have been improperly held against movement. And the invention has for further objects the effecting of all other improvements in structure or function that may be found to obtain in the mechanism hereinafter described or claimed.

The canceling function of the mechanism hereinafter described will be best understood by a primary reference to the canceling mechanism set forth in my above mentioned recent Patent No. 767,107, on "Canceling mechanism for calculators", with collateral reference to the numeral-wheel prime-actuator and carrying mechanisms and stop mechanism set forth in my other two above-mentioned recent Patents Nos. 762,520 and 762,521. And the carrying-mechanism release function of certain mechanism hereinafter described, with its automatic operability by and incidentally to the canceling actuator's operation, will be best understood by primary reference to the said Patents Nos. 762,520 and 762,521, with further reference to the canceling mechanism set forth in my aforesaid Patent No. 767,107. And all of the functions of the hereinafter described mechanism may be best understood by reference to all of the three last named recent patents, and to my earlier patents such as the No. 366,945 hereinabove first mentioned.

Figure 4:
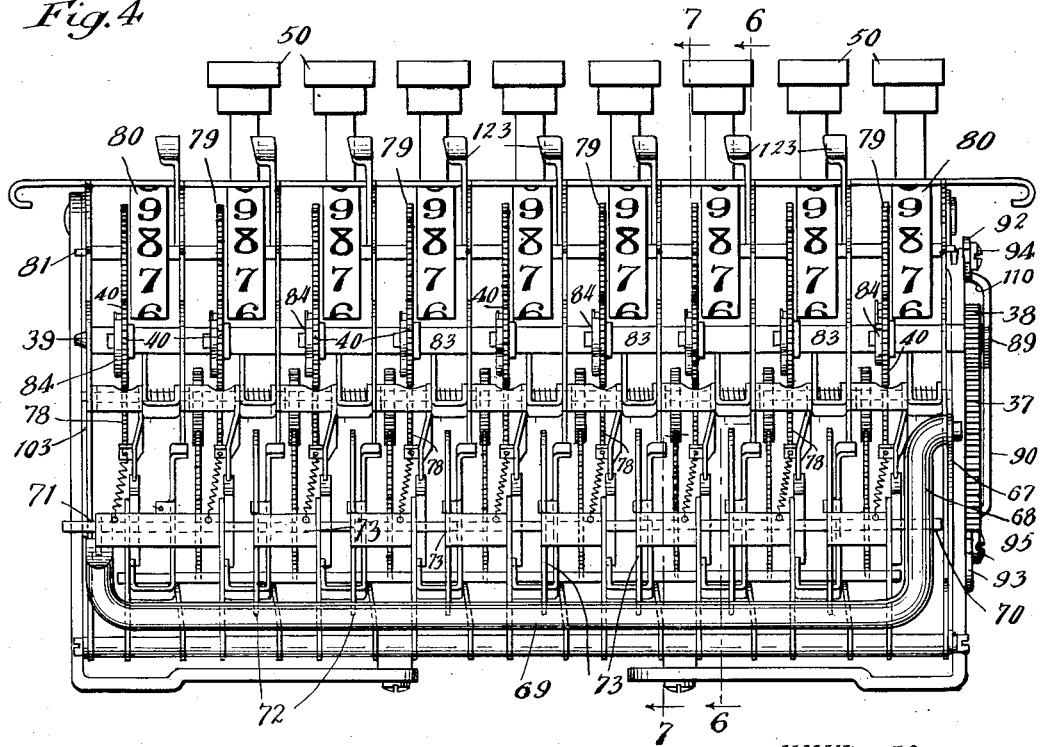
Figure 5:
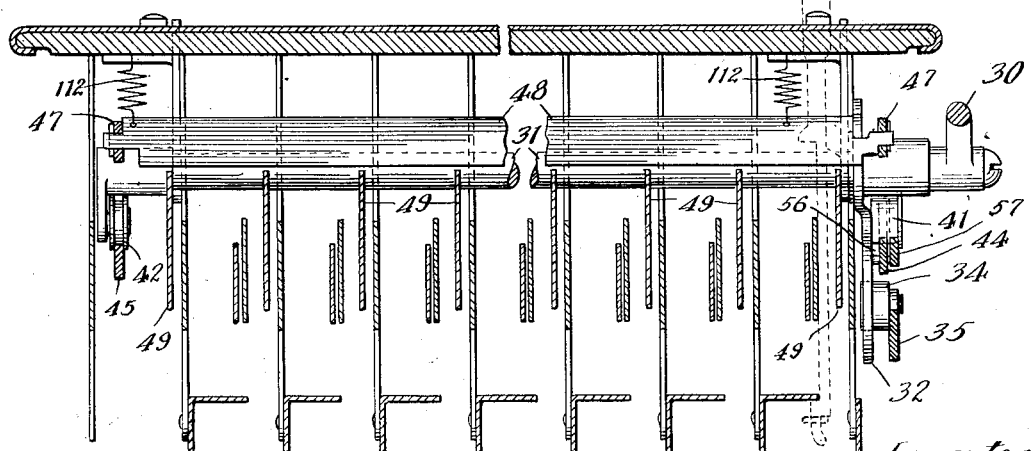
Figure 17:
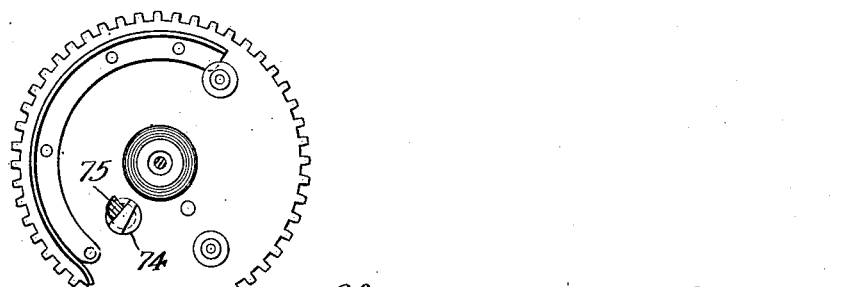
Figure 18:
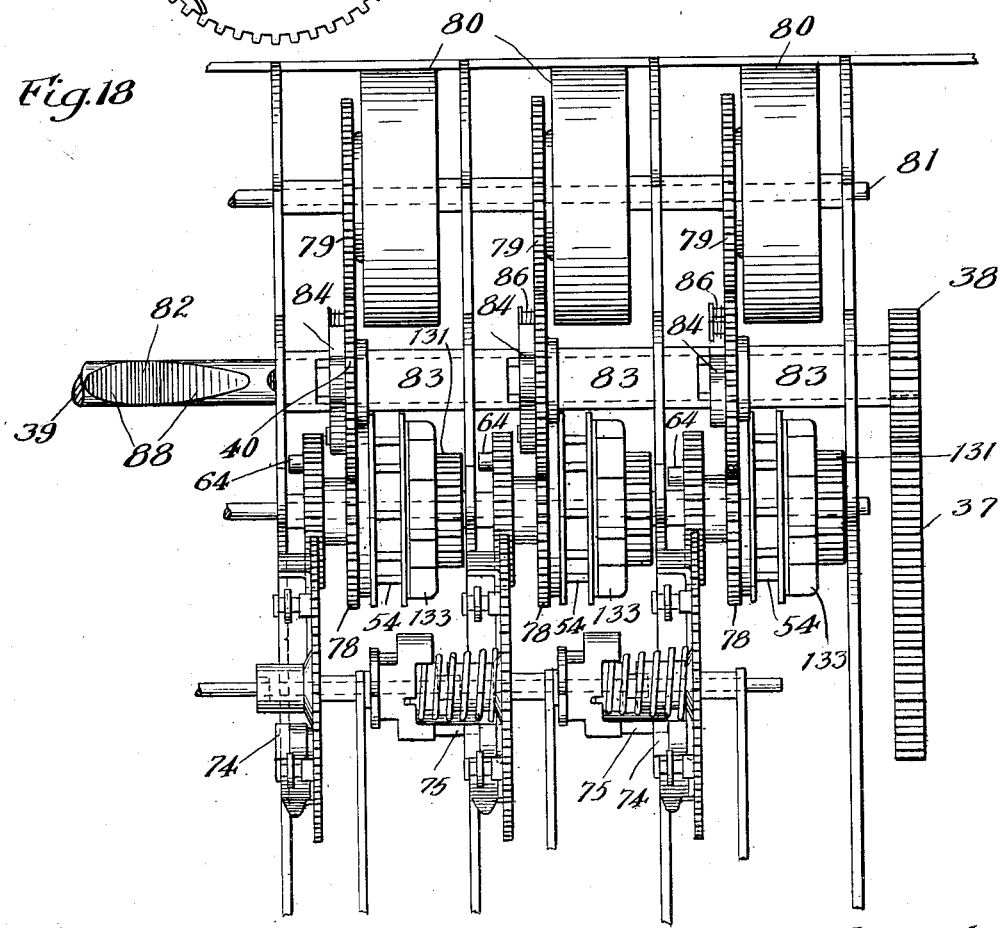

In the accompanying drawings, forming a part of this specification, and in which like reference numerals indicate like parts in all the figures:—Figure 1 is a top plan view of the machine with part of the casing broken away; Fig. 2 is an elevation of the right hand side of the machine within the casing, and showing the canceling handle-lever in normal position; Fig. 3 is a section on line 3—3 of Fig. 1; Fig. 4 is a front elevation of the machine with the casing removed; Fig. 5 is a sectional view on line 5—5 of Fig. 2; Fig. 6 is a section on line 6—6 of Fig. 4, showing the accumulator mechanism and its stop devices and releasing devices; Fig. 7 is a section on line 7—7 of Fig. 4, also showing the accumulator mechanism and certain of its stop devices and its releasing devices; Fig. 8 is a detail of the "units" carrying pinion and the canceling stop-lever coacting with it, said pinion meshing with the carrying-gear, which is partly shown; Fig. 9 is a detail longitudinal view of the rotatable shaft on which the intermediate gears of the accumulator mechanism are mounted, showing the canceling-pinion secured to the right-hand end of said shaft and also the incline-sided notches and beveled left end that facilitate inserting and withdrawing said shaft through the pawl-bearing intermediate gears; Fig. 10 is a detail of the retaining plate that is pivotally mounted on the left hand side frame of the machine and engages the left hand ends of various transverse shaft-rods of the machine, to prevent the lateral displacement of said rods; Fig. 11 shows the slotted cam that controls the canceling segment-lever by which the shaft of the intermediate gears is rotated; Fig. 12 shows the right hand one of the pair of cam arms that control the column-actuator crossbar during the canceling operation; Fig. 13 shows the cam-slotted end of the stop-controlling elbow-lever; Fig. 14 is a detail of the hub and pivot of the canceling segment-lever; Fig. 15 is a detail view showing a carrying-gear and its escapement member, with the carrying spring between them, in each of two adjacent orders of the machine; Fig. 16 is a detail showing the internal ratchet that is secured to the pinion meshing with a column actuator, and the pawl coacting with said ratchet and mounted on the lantern-ratchet of the accumulator gear of like order; Fig. 17 is a detail showing a side view of one of the carrying gears and a section of the long arm of its escapement member in the relation shown in Fig. 15, with the carrying gear rotated to the limit determined by the contact of its guard-stud with the rear edge of said long arm of the escapement member; and Fig. 18 is a front view of several adjacent orders of the accumulator mechanism, showing the trains of gears and other rotary members with the various stops and detents and pawl-levers broken away.

30 is the canceling-actuator handle-lever, to be swung first backward and then forward, fixed to the right-hand end of the canceling-actuator rock-shaft 31 that is supported transversely of the machine, the other end of said rock-shaft extending through the left-hand side-frame (Figs. 1, 2, 5). Fixedly secured to said rock-shaft near its right-hand end, within the right-hand casing-wall of the machine, is the segmental slotted cam 32 (Fig. 11), whose curvilinear cam-slot 33 engages the dolly-roll 34 fixed to the rear end of the canceling segment-lever 35 that is pivoted at 36 and has its free or forward end expanded into the segment-gear 37 meshing with the pinion 38 fixed on the right-hand end of the shaft 39 that bears the intermediate-gears 40 of the numeral-wheel mechanism. The said canceling segment-lever 35 oscillates on its pivot, imparting various rotary movement to said intermediate-gear shaft 39, in response to the movement of said dolly-roll 34 in said cam-slot 33 as the said rock-shaft 31 is rocked by handle-lever 30. Swung by connection-arms from the right-hand and left-hand ends respectively of the rock-shaft 31, within the side casing-walls of the machine, are the dolly-rolls 41 and 42, each engaging the open cam-slot 43 (Fig. 12) in the expanded free end of the corresponding one of the pair of cam-arms 44 and 45 that are pivoted at 46, forward of the rock-shaft 31, on the respectively opposite sides of the machine frame. Said cam-arms 44 and 45 support between them, secured to the upward extensions 47 at the rear of the cam-slot of each of said arms, the column-actuator cross-bar 48 (Figs. 3, 5), transverse of the top edges of all the column actuator levers 49, 49 that impart the prime actuations to the numeral wheel mechanism of each denomination of the keyboard, said column actuators being the levers directly oscillated by the depression of the keyboard keys 50. The movement of the said dolly-rolls 41 and 42, in unison, in the cam-slots 43, of said pair of cam-arms 44, 45, as the rock-shaft 31 is rocked by the handle-lever, variously lowers and lifts the said column-actuator cross-bar 48, to alternately depress and release the column-actuators, which are normally held raised by their own springs 51, to effect a one-space forward movement of the numeral wheels, by their respective column actuators, toward the end of the back stroke of the canceling handle and again toward the end of the return stroke of said handle, and also to effect certain necessary releases of the numeral wheels, during the canceling operation, from the lock of the locking-detents 52 (Fig. 6) that normally hold said wheels locked against forward movement—such release being effected by the lowering of the studs 53 that normally press said detents into engagement, with the accumulator-wheel lantern-ratchets 54, against the tension of the detent-springs 55 that constantly tend to withdraw said detents from such engagement. The free end of the aforesaid right-hand cam-arm 44 is held from swerving inward, toward the machine, by the stud 56 fixed in said arm and constantly bearing against the outer face of the segmental cam 32. The aforesaid right-hand cam-arm dolly-roll 41 is of sufficient width to engage not only the right-hand cam-arm but also, just without said arm, the cam-faced rear end 57 (Figs. 2, 13) of the stop-controlling elbow-lever 58, whose pivot-hole 59 engages pivot 46, forward of the canceling rock-shaft 31, and whose lower and forward end 60 is in forked pivotal engagement with the upright connection-member 61 fixed to the right-hand end of the canceling-stop rock-bar 62 that is transverse of the machine below and just back of the accumulator-wheel mechanism, said rock-bar supporting along its transverse length the series of upright hooked stop-levers 63, 63 (Figs. 2, 3, 7, 8), one for each denomination, that are swung forward, by the forward rocking of said rock-bar, to block the path of the respective stop-studs 64 on the carrying-pinions, which are secured to the hubs of the respective accumulator-gears, such stop action being designed to check the forward rotation of the units numeral-wheel at a reading of "9" and of each higher numeral wheel at a reading of "8" just before the conclusion of the canceling operation. Said canceling-stop rock-bar is thus rocked by the oscillation of the said stop-controlling elbow-lever in response to the movement of said dolly-roll 41 in the cam-slot of said lever as the canceling handle is swung back and forth.

The connection-member 61, on the right-hand end of the canceling-stop rock-bar 62, is pivotally connected, at 65, to the rear end of the link 66 that leads obliquely forward and upward and is pivotally connected, at its forward end, 67, to the upwardly projecting arm 68 of the swinging release-bar 69 (Figs. 1, 2, 3, 4, 6, 7) that extends transversely across the front of the machine and is swung on the pivot points 70 and 71 at either side of the accumulator-wheel mechanism, said release-bar acting, as it swings inward, to press against the tail-pieces 72 that depend from the pivoted carrying-mechanism latches 73 (which have the same latching function as the latches also numbered "73" in my two above-named Patents Nos. 760,520 and 762,521). This pressure of the releasing-bar against said tail-pieces of the carrying latches forcibly lifts any of the said latches that may be in engagement with and checking the release of their corresponding carrying-mechanisms, and holds all of said latches out of engagement with the carrying mechanisms until the completing of the canceling operation. Such releasing action occurs at the initial rocking of the stop-controlling elbow-lever at the beginning of the rearward stroke of the canceling handle, and it will positively release any carrying latches that have become jammed, so as to resist the normal unlatching action, by the improper numeral-wheel manipulation mentioned in the introductory part of this specification. Said jamming of a carrying latch to an extent requiring such releasing operation, would result from the accumulated tension put upon a carrying gear and causing the stud 74, which normally limits the forward rotation of said gear, to press unduly against the rear edge of arm 75 of the carrying escapement that is engaged by the undercut hook 76 of the corresponding latch 73 (Figs. 15, 17, 18), so that said latch would be firmly held depressed and itself hold depressed the column-actuator that normally lifts such latch out of engaging position, and the numeral-wheel actuating mechanism of the machine would become thereby jammed or locked until the said latch is freed by some sudden shock or movement of coacting parts. This releasing-bar, swung by the initial movement of the canceling-handle, is a forcible and entirely positive means of freeing any latch or latches 73 that may have become so caught, and the canceling-handle may be given a slight rearward movement for this purpose alone, without completing the canceling stroke of said handle; but such releasing of improperly jammed carrying latches would usually cause an improper overthrow of the carried numeral-wheels, so that it would become necessary to cancel the machine, such cancellation being effected, in such case, by completing that stroke of the canceling handle and then making a second full back and forth canceling stroke with said handle,—and the releasing-bar mechanism is therefore provided to function automatically as an incident of the normal back and forth canceling movement of the canceling-actuator handle. The latches 73, if caught in the manner above mentioned, may also be freed by merely striking the "9" keys of the keyboard rapidly and successively from left to right, so that the long 9-space stroke of each column-actuator would cause the latch-lifting stud 77, on the side of the forward end of such actuator, to strike the free end of the corresponding latch 73 a lifting blow, thereby freeing it from the latched escapement member of the carrying mechanism; but such freeing of any improperly jammed carrying latches would, as before said, usually result in an improper overthrow of the carried numeral-wheel, necessitating a subsequent canceling of the machine by the canceling handle, so that all such special manipulation of the keys is saved by making the positively acting releasing-bar function automatically as an incident of the movement of the canceling handle. Also, the automatic positioning of said releasing-bar in pressure contact with the tail-pieces of said latch 73 during the canceling operation, positively holding said latches out of possibility of engagement with the carrying-mechanisms, precludes any possibility of jamming any of the carrying-latches 73 by any stroke or strokes of the canceling-handle,—a stroke of the canceling actuator being operative to put tension on the carrying-gears by forwardly rotating the accumulator-wheels and pinions that actuate said gears, during an interval when the column-actuators that normally hold the latches 73 lifted are depressed. The stiff and unyielding releasing bar, exerting an entirely positive and effective leverage on the tail-pieces of the latches 73, and actuated through the oscillation of the rigid stop-controlling elbow-lever of the canceling mechanism, is a complete preventive of any possibility of the numeral-wheel mechanism becoming locked by intentionally or accidentally improper manipulation of the operating devices of the machine.

In the comptometers of my earlier patents, the numeral-wheels, bearing the numbers exposed at the reading line of the machine, are themselves the accumulator-wheels directly impelled by the prime-actuator mechanism and carrying mechanism; but in the machine shown in the drawings of the present specification, the accumulator-wheels are simply accumulator-gears, 78, meshing with the intermediate gears 40 freely mounted on the higher intermediate-gear shaft 39, said intermediate gears 40 in turn meshing with the numeral-wheel gears 79 that are secured to the numeral-wheels 80 and mounted on the still higher numeral-wheel shaft 81. (Figs. 2, 4, 6, 7, 18). These three intermeshing gears in each denominational order, the accumulator gears 78 and intermediate gears 40 and numeral-wheel gears 79, are of mutually equal diameter and pitch, and the movement and limitation of movement of the accumulator-wheels by the column-actuators and carrying mechanisms and stop-mechanisms are thus transmitted positively to the numeral-wheels, the intermediate gears effecting the reversal of movement that causes the numeral-wheels to rotate in the same direction as the accumulator-wheels. The successively higher shafts upon which the three said sets of gears are mounted raise the numeral-wheels to the requisite level to bring the reading line to the highest and most clearly readable position; and the intermediate gears also permit the numeral wheels to be made as large as possible, so as to increase the legibility of their numerals, without increasing the diameter, and consequent space occupied by, the accumulator wheels. Such reorganization of the numeral-wheel actuating mechanism has involved much difficulty in so reducing the weight of the numeral wheels that the key-touch will be no heavier than before and yet the numeral-wheels be strong enough to resist the great centrifugal and angular strains that they are subjected to by their extremely rapid rotary movements and sudden stoppings, but such desired result has been attained and has withstood the test of practical service. And the intermediate gears and their shaft have permitted an effective application of the canceling throw accomplished by the before-mentioned canceling segment-lever 35 that meshes with the pinion 38 fixed on the right-hand end of the intermediate-gear shaft 39. This intermediate-gear shaft is provided with a series of flat-bottomed and incline-sided grooves 82, one to register with the hub 83 of each intermediate gear 40. (Figs. 7, 9, 18.) The deepest part of each such groove is adapted to accommodate the engagement, with the said shaft 39, of the hook-pawl 84 that is pivoted, at 85, on each intermediate gear and constantly pressed toward said shaft, through an aperture in the gear hub 83, by the spring 86 that is also fixed, at 87, to such gear (Fig. 7). The inclines 88, 88, sloping each way from the flat bottom of each groove 82, and the beveled left end of the shaft, serve to automatically lift any pawl or pawls 84 that may be in position to interfere with the withdrawal or insertion of the shaft 39 when said shaft is withdrawn or inserted in assembling the machine. The hook-pawls are so formed, that they permit the intermediate gears to be freely rotated forward on the shaft 39 by the accumulator mechanism and that the shaft itself may be freely rotated backward, within the intermediate gears, by the upstroke of the canceling lever segment 37; but said hook-pawls positively engage said shaft, at a definite relative angular position, when said shaft is itself rotated forward by the downstroke of canceling lever segment 37, so that such downstroke of said segment may rotate all of the intermediate gears, and thereby the numeral-wheels, to a definite desired position during the return stroke of the canceling-handle,—such definite position being a reading of "9" for the units numeral-wheel and of "8" for each of the wheels of higher order. This difference in the reading to which the units wheel is brought, as against the higher wheels, is effected, without modification of the units intermediate-gear mechanism, by merely displacing the said gear one-tenth of a circle, in assembling the parts, so that the hook-pawl on said gear is an angular distance of one-tenth of a circle behind the hook-pawls on the higher intermediate-gears, with respect to the line of grooves on shaft 39, whereby the said shaft, when rotated forward, "picks up" the units intermediate-gear one-tenth of a rotation in advance of the intermediate-gears of higher order and so rotates said gear, and the units numeral-wheel, one numeral-reading farther than the wheels of higher order, during the down-stroke of the canceling lever segment, giving a reading of "9" at the units place and of only "8" in each higher place. Such one-tenth displacement of the units intermediate-gear is readily effected in the assembling, because these gears have each thirty teeth, a multiple of ten, and it is merely necessary to mesh the units intermediate-gear with its numeral-wheel gear so that the radial position of the hooked-pawl shall be three gear-teeth removed from the relative radial position of the hooked-pawls on the intermediate gears of higher order. The hooked form of the hook-pawls on the intermediate gears affords a peculiarly positive engagement of the grooved shaft by said pawls. And the grooving of said shaft and placing of pawls on the gears is more effective than pivoting pawls on the shaft and providing ratchets on the gears, and facilitates the insertion and withdrawal of said shaft.

The intermediate-gear shaft is retained from lateral displacement by the arm 89 of the retaining clip 90, at the right-hand side of the machine (Figs. 2, 4). This retaining clip 90 also retains from lateral displacement the segment-gear end of the canceling segment lever 35. Said clip is positioned on the machine by studs 91, and held in place by the engagement of its forked arms 92 and 93 with the retaining screws 94 and 95 respectively; so that by merely loosening said screws and lifting said clip backward and off of its studs 91, the intermediate-gear shaft 39 is released and may be withdrawn, and the segment-gear end of the aforesaid lever 35 is also released. The further release and withdrawal of said lever 35 is effected by simply loosening the retaining screw 96 that grips the notch 97 in the under edge of the retaining latch 98 and then turning said latch, on its pivot 99, (Figs. 2, 14) so that its lower arm 100 is released from engagement with the inner grooved hub 101 of said lever 35. Such turning of said retaining-latch 99 at the same time removes its upper arm 102 from overlapping relation to the lower edge of the stop-controlling elbow-lever 58 and permits said lever 58 to be withdrawn from its own pivot 46 as soon as lever 35, which is outside of lever 58, is withdrawn from its pivot bearing 36. A further retaining member of importance in this connection is the retaining-plate 103 that locks from lateral displacement a number of the shaft-rods that are transverse of the machine, including the shaft-rods over whose right-hand ends the canceling segment-lever 35 sweeps and whose displacement toward the right would interfere with such sweep of said lever (Figs. 4, 10). This retaining-plate 103 is pivotally mounted at 104 to the left-hand side of the frame of the machine, and is normally held in place by the left end of rod 105, entering the hole 106 in said plate. The peripheral edges 107 of said plate are adapted to engage the left-hand ends of the several shaft-rods, and each such shaft-end has an annular groove 108 of just sufficient width so that when said shaft-ends are in their proper and normal position, the plate 103 may be slightly rocked on its pivot and will engage each such groove 108 and positively hold the shaft-rods from any lateral displacement. Said grooves 108 are narrow enough so that they cannot be caught by any of the other metal members through which the shaft-rods are inserted in the machine, whether inserted from the right or the left. Such narrowing of said grooves is made possible by making the retaining-plate 103 of thinner metal than any of the said other metal members through which the shaft-rods must pass. To rock the retaining-plate out of engagement with the grooved shaft-ends it is only necessary to withdraw rod 105 from hole 106. Said retaining-plate, when rocked out of its normal position, just covers, with its edge 109, the extreme left-hand end of shaft-rod 105 and holds said shaft against movement toward the left, thereby causing the projecting right-hand end of said shaft to interfere with putting the casing on the machine until said plate is rocked back to normal and locked by the left end of said shaft. The aforesaid retaining clip 90 is provided with a stop 110 that prevents the canceling lever segment 37 from being thrown too far upward, and with a stop-shoulder 111 that likewise prevents said lever from being thrown too far downward by a violent return-stroke of the canceling handle (Fig. 2); the said stops are merely to relieve the accumulator mechanism from any strain in the event of a violent movement of said lever, the swing of said lever being also limited by the cam-slot of the slotted cam that controls its rear end, and under normal movement, when there is no appreciable yielding of the parts, said lever need not actually strike said stops but may be checked just short of contact with them.

The foregoing outline of the general character and operation of most of the working parts of the mechanism has shown that the back and forth movement of the canceling handle is transformed and transferred to the numeral-wheel controlling mechanisms through three actuating elements, namely:— The pair of cam-arms, 44, 45, supporting the column-actuator cross-bar 48; the stop-controlling elbow-lever 58; and the canceling segment-lever 35. And it has also been shown that said cam-arms 44, 45, are controlled, in unison, by their open cam-slots 43 engaging the dolly-rolls 41 and 42; and that said elbow-lever 58 is controlled by its open cam-slot engaging said dolly-roll 41; and that said segment-lever 35 is controlled by its dolly-roll 34 engaging cam-slot 33 in the slotted cam 32. The springs 112, 112 (Figs. 2, 3, 5), drawing said cross-bar 48 upward, press the cam-slots 43, of cam-arms 44, 45, into operative contact with the said dolly-rolls 41, 42; and the spring 113 (Fig. 2), stretched between the downwardly projecting tongues 114 and 115 of, respectively, said elbow-lever 58 and segment lever 35, presses the cam-slotted end 57 of said elbow-lever into operative contact with said dolly-roll 41. And said spring 113 also aids the control of segment-lever 35 by the cam-slot 33 of slotted-cam 32. And at the limit of the return stroke of the handle-lever, the tension of springs 112, transmitted through cam-arms 44, 45 to dolly-rolls 41, 42, together with the tension of said spring 113, transmitted through the rear arm of lever 58 to said slotted-cam 32, holds the upper edge of said slotted cam against screw-stud 114 in the right-hand side-frame (Fig. 2), retaining the handle-lever in its normal obliquely forward position,—said stud 114 also limiting the rearward throw of the handle, by intercepting stop-arm 115 of said slotted cam. The contour of these several cam-slots, controlling cam-arms 44, 45 (Fig. 12) and elbow-lever 58 (Fig. 13) and segment-lever 35 (Fig. 11), determines the hereinafter described sequence of operations of the entire machine, in response to the back and forth throw of the canceling handle. At normal, the dolly-rolls 41 and 42 (Figs. 2, 3, 5) engage the hooked rear ends 116 of the cam-slots 43 in cam-arms 44, 45 (Figs. 2, 3, 12), respectively, and cross-bar 48 is lifted above the column actuators; and said dolly-roll 41, on the right-hand side of the machine, also engages the hooked rear end of the cam-slot in elbow-lever 58; and the dolly-roll 34, on segment-lever 35, is positioned near the forward end of cam-slot 33 in slotted-cam 32. As the canceling handle commences the rearward stroke, dolly-rolls 41, 42 ride over arc 117 and into arc 118 of cam-slots 43 of cam-arms 44, 45 (Fig. 12), which arcs are struck on such centers with respect to the axes of oscillation, that as said rolls traverse them, the cam-arms 44, 45, with their cross-bar 48, gradually depress all of the column-actuators to the extent necessary to position them to turn their respective numeral wheels one numeral space on their subsequent up-stroke,—that is, in readiness to add "1" to the then reading of each numeral-wheel (including the ninth or highest order, whose column-actuator has no keys and is functional during the canceling operation only). During this depression of the column-actuators by cross-bar 48, the dolly-roll 41 has ridden into arc 119 of the cam-slot in elbow-lever 58 (Figs. 2, 13), which arc is struck on such a center that thereupon elbow-lever 58 rocks shaft 62 so as to throw connection-number 61 and stop-levers 63 into their forward position, and in such position the respective lips 120 (Figs. 6, 7, 8) that project to the left from the top of each stop-lever 63 and of member 61 are thrown into the path of and intercept the stops 121 on the right-hand side of the segment-gears of the respective column-actuators, so that said column-actuators are prevented from being depressed more than one adding-space by the just above mentioned action of cam-arms 44, 45. Such forward swing of stop-levers 63 has also caused them to engage the hooked-arms 122 of the respective "subtraction-levers" 123 (Figs. 4, 6) and so rock said subtraction-levers as to lift the carrying-pawls 124 that are pivoted on the rear ends of carrying-levers 125, so that no carrying impulses will be transferred by subsequent actuations of the carrying devices of the accumulator mechanism until such time as the subtraction-levers are released by the return of stop-levers 63 to normal. And this forward movement of stop-levers 63 has also brought their stop-points 126 (Figs. 6, 7, 8) into the path of stop-studs 64 on the carrying-pinions, to prevent the units numeral-wheel from passing a reading of "9" and each higher wheel a reading of "8". The said forward rocking of connection-member 61 has also swung the release-bar 69 (Figs. 1, 2, 3, 4, 6, 7) against the tail-pieces of carrying latches 73 to positively position said latches out of latching position, in the manner hereinabove set forth.

The elbow-lever 58 and the parts controlled by it, all remain in the positions just recited during the rest of the rearward stroke of the canceling handle and until the return stroke has brought dolly-roll 41 back to the rear end of arc 119 of the cam-slot in elbow-lever 58. But, meanwhile, the continuation of the rearward stroke of the canceling handle causes dolly-rolls 41, 42 to ride into arc 127 (Fig. 12) of cam-slots 43 in cam-arms 44, 45, which arc is struck on such a center that thereby said cam-arms, with their cross-bar 48, rise sufficiently, as said dolly-rolls ride forward over said arc, to permit the column-actuators to make part of their upward one-space adding-stroke but not enough thereof to either complete said one-space addition or permit the relocking of the accumulator-gears by the locking-detents 52 that are pressed into locking position by the studs 53 when the column-actuators are fully raised.

Just after the rearward stroke of the canceling handle has brought the dolly-rolls 41, 42 past the forward end of arc 127 of cam-slot 43 in cam-arms 44, 45, the slotted-cam 32 (Figs. 2, 5, 11) has swung far enough forward to bring dolly-roll 34 of segment-lever 35 to the rear end of arc 128 of cam-slot 33, which arc is struck on such a center that thereby the segment-gear of said lever 35 has been fully raised, idly rotating the shaft 39 backward within the intermediate-gears 40, and is in readiness to make the operative down-stroke that picks up and rotates forward the intermediate-gears 40 whose numeral-wheels are to be brought to the beforementioned reading of "8" (and "9" in the units order). During the ensuing conclusion of the rearward stroke of the handle and the commencement of the forward stroke, the canceling segment-lever 35 remains stationary, and the intermediate-gear shaft 39 immovable, because through this interval the dolly-roll 34, on said lever 35, is riding in arc 129 at the rear of cam-slot 33, which arc is struck on a center coincident with the axis of oscillation of slotted cam 32. Just before and during the said conclusion of the rearward stroke of the handle, dolly-rolls 41, 42 ride into, and forward over, arc 130 at the forward end of cam-slots 43 in cam-arms 44, 45 (Fig. 12), which arc is struck on such a center that thereby the said cam-arms rise sufficiently to permit the column-actuators to complete their upward stroke, adding one unit to the reading of each numeral-wheel. This action provides for shifting forward to "0" any numeral-wheel, above the units order, that happened to stand at a reading of "9" at the beginning of the canceling operation of the machine, and for shifting the units wheel to "1" if it happened to read "0",—and such shifting is necessary because the subsequent stroke of the canceling segment-lever 35 can only move the wheels through eight numeral-spaces, and the units wheel must read not less than "1" and the higher wheels each not more than "8" or else said stroke of the canceling-lever would fail to bring up the required reading of "9" in the units place and "8" in every higher place. If the units wheel stands at "9" or any higher wheel or wheels at "8" at the beginning of the canceling operation of the machine, the column-actuators will remain depressed in such orders, notwithstanding the aforesaid lifting of the cross-bar 48, because at this time the stop-points 126, of stop-levers 63, are blocking those numeral-wheels from passing a reading of "9" in the units place and "8" in each higher place, as before explained, and the said column-actuators would be held from rising because their pinions 131 could not rotate forward when the accumulator-gears of corresponding order are so blocked from further movement. But in any instance where this column-actuator movement, at the conclusion of the rearward stroke of the canceling-handle, so shifts a numeral-wheel from "9" to "0", the necessarily accompanying carrying-movement performed by the corresponding carrying-lever does not "carry one" to the next higher order of the accumulator mechanism, because at this time all the carrying-pawls are still held out of operating position by the "subtraction-levers" that were actuated by the stop-levers 63 in the manner before stated. Such interruption of the carrying function at this time is necessary because otherwise a carrying-pawl would be pressed against the lantern-ratchet 54 in an order where the accumulator-gear was already blocked at a numeral-wheel reading of "8", and then the final movement of the canceling operation, to be presently described, and which may advance any or all of the accumulators to various extent, would tend to jam or lock the mechanism.

During the beginning of the frontward or return stroke of the canceling-handle, the dolly-rolls 41, 42 ride back over the aforesaid arc 130 and into arc 127 of cam-slots 43 (Fig. 12), thereby again depressing cam-arms 44, 45 sufficiently to so far depress the column-actuators that the accumulator mechanisms are again released from the lock of the locking-detents 52. Just as this release occurs, the return swing of slotted-cam 32 carries dolly-roll 34 into arc 128 of cam-slot 33 (Fig. 11), and the traversing of this arc, as the frontward throw of the handle swings the slotted-cam backward, imparts to the canceling lever segment 37 the downward stroke whereby the intermediate-gear shaft 39 picks up all the intermediate gears and brings the numeral-wheels to the aforesaid reading of "9" in the units place and "8" in each higher place. During such down-stroke of segment 37, the dolly-rolls 41, 42 have ridden back over arc 127 and into arc 118 of cam-slots 43 of cam-arms 44, 45, and all the column-actuators have been thereby again depressed in readiness to add one unit to each numeral-wheel, and so remain during the traversing of said arc 118, which is struck on a center coincident with the axis of oscillation of the canceling handle. The aforesaid down-stroke of segment 37 is actually continued very slightly beyond the point where the accumulator-wheels reach the angular positions to give the above-mentioned desired readings, so that the pawl 132 (Fig. 16) on each accumulator-gear shall be certain to engage the proper internal tooth of the ratchet 133 that is secured to the pinion to be actuated by the column-actuator of corresponding order; and then the segment 37 is very slightly lifted, to normal position, by the dolly-roll 34 riding into arc 134, at the forward end of cam-slot 33 (Fig. 11), which arc is struck on such a center as to accomplish this replacement of lever 35 and permit the consequent normal angular positioning of the accumulator wheels. Just as this is effected, and the column-actuators have been fully depressed, the finish of the return stroke of the canceling-handle lets the dolly-rolls 41, 42 ride over arc 117 and into the rear ends 116 of cam-slots 43 (Fig. 12), thereby lifting the cam-arms 44, 45 so as to raise cross-bar 48 to normal, and the dolly-roll 41 rides back out of arc 119 and into the rear end of the cam-slot of elbow-lever 58, and said elbow-lever is rocked back to normal, returning to normal operative position the carrying-pawls and carrying latches displaced by the prior rocking of rock-bar 62 (Figs. 6, 7), and at the same time releasing the accumulator mechanism from the block of the stop-points of stop-levers 63, thereby permitting the column-actuators to make the final one-space up-stroke that adds one to each numeral-wheel, giving a reading of "0" in the units place and of "9" in each higher place. That this release may be slightly earlier for the higher wheels than for the units wheel, which is one numeral-space in advance of said higher wheels, the stop-point on the right-hand stop-lever 63 has a somewhat longer point, 135 (Fig. 8), than the other stop-levers,— so that the higher wheels may receive the one-space adding movement of their column actuators, and all reach "9", before the units wheel advances from "9" to "0". Said passing of the units wheel from "9" to "0", by the up-stroke of its column-actuator, instantly causes a "carry" of one unit to the higher places, and as all such higher places have just previously been brought to "9" by their own column-actuators, such carried unit is flashed to the left, through the series of "9s", and brings all the wheels to a reading of "0".

The completing of the canceling operation by the carrying-mechanism results in positively restoring all the actuating and stop-mechanism to normal position, and is also utilized in the machine of my prior Patent No. 767,107; but in the machine of that patent all the rest of the canceling was accomplished entirely by repeated short impulses of the column-actuators, said actuators being vibrated by a series of notched cam-plates (numbered "60" in said patent).

My invention is hereinabove set forth as embodied in one particular form of construction, but I do not limit it thereto or to less than all the possible forms in which the side invention as hereinafter claimed may be embodied and distinguished from prior devices.

I claim:—

1. In a calculating machine, in combination: multiple-order accumulator mechanism; a series of column-actuators; an independent canceling device adapted to advance a plurality of the orders from diverse positions to a predetermined limit; and cancellation controlling means to operate said canceling device and effect a succeeding adding movement of the series of column actuators; substantially as specified.

2. In a calculating machine, in combination: multiple-order accumulator mechanism; a series of column-actuators; an independent canceling device adapted to advance a plurality of the orders, at one movement, from diverse positions to a predetermined limit; and cancelation controlling means to operate said canceling device and effect a succeeding adding movement of the series of column actuators; substantially as specified.

3. In a calculating machine, in combination: multiple-order accumulator mechanism; a series of column-actuators; an independent canceling device adapted to advance a plurality of the orders from diverse positions to a predetermined limit; and cancellation controlling means to operate said canceling device and effect a succeeding one-space adding movement of the series of column actuators; substantially as specified.

4. In a calculating machine, in combination; multiple-order accumulator mechanism; a series of column-actuators; an independent canceling device adapted to advance a plurality of the orders, at one movement, from diverse positions to a predetermined limit; and cancellation controlling means to operate said canceling device and effect a succeeding one-space adding movement of the series of column actuators; substantially as specified.

5. In a calculating machine, in combination: multiple-order accumulator mechanism; a series of column-actuators; an independent canceling device adapted to advance a plurality of the orders from diverse positions to a predetermined limit; and cancellation controlling means to operate said canceling device and effect a prior and a succeeding adding movement of the series of column actuators; substantially as specified.

6. In a calculating machine, in combination: multiple-order accumulator mechanism; a series of column-actuators; an independent canceling device adapted to advance a plurality of the orders from diverse positions to a predetermined limit; and cancellation controlling means to operate said canceling device and effect a prior and a succeeding one-space adding movement of the series of column actuators; substantially as specified.

7. In a calculating machine, in combination: multiple-order accumulator mechanism; a series of column-actuators; an independent canceling device adapted to advance a plurality of the orders from diverse positions to a predetermined limit; and cancellation controlling means to operate said canceling device and effect a prior adding movement of the series of column actuators; substantially as specified.

8. In a calculating machine, in combination: multiple-order accumulator mechanism; a series of column-actuators; an independent canceling device adapted to advance a plurality of the orders from diverse positions to a predetermined limit; and cancellation controlling means to operate said canceling device and effect a prior one-space adding movement of the series of column actuators; substantially as specified.

9. In a calculating machine, in combination: multiple-order accumulator mechanism; a series of column-actuators; an independent canceling device adapted to advance a plurality of the orders, at one movement, from diverse positions to a predetermined limit; and cancellation controlling means to operate said canceling device and effect a prior and a succeeding adding movement of the series of column actuators; substantially as specified.

10. In a calculating machine, in combination: multiple-order accumulator mechanism; a series of column-actuators; an independent canceling device adapted to advance a plurality of the orders, at one movement, from diverse positions to a predetermined limit; and cancellation controlling means to operate said canceling device and effect a prior and a succeeding one-space adding movement of the series of column actuators; substantially as specified.

11. In a calculating machine, in combination: multiple-order accumulator mechanism; a series of column-actuators; an independent canceling device adapted to advance a plurality of the orders, at one movement, from diverse positions to a predetermined limit; and cancellation controlling means to operate said canceling device and effect a prior adding movement of the series of column actuators; substantially as specified.

12. In a calculating machine, in combination: multiple-order accumulator mechanism; a series of column-actuators; an independent canceling device adapted to advance a plurality of the orders, at one movement, from diverse positions to a predetermined limit; and cancellation controlling means to operate said canceling device and effect a prior one-space adding movement of the series of column actuators; substantially as specified.

13. In a calculating machine, in combination: multiple-order accumulator mechanism, including carrying mechanisms adapted to permit simultaneous adding actuations of a plurality of column-actuators; a series of column-actuators; an independent canceling device adapted to advance a plurality of the orders from diverse positions to a predetermined limit; and cancellation controlling means to operate said canceling device and effect a succeeding adding movement of the series of column actuators; substantially as specified.

14. In a calculating machine, in combination: multiple-order accumulator mechanism, including carrying mechanisms adapted to permit simultaneous adding actuations of a plurality of column-actuators; a series of column-actuators; an independent canceling device adapted to advance a plurality of the orders, at one movement, from diverse positions to a predetermined limit; and cancellation controlling means to operate said canceling device and effect a succeeding adding movement of the series of column actuators; substantially as specified.

15. In a calculating machine, in combination; multiple-order accumulator mechanism, including carrying mechanisms adapted to permit simultaneous adding actuations of a plurality of column-actuators; a series of column-actuators; an independent canceling device adapted to advance a plurality of the orders from diverse positions to a predetermined limit; and cancellation controlling means to operate said canceling device and effect a succeeding one-space adding movement of the series of column actuators; substantially as specified.

16. In a calculating machine, in combination; multiple-order accumulator mechanism, including carrying mechanisms adapted to permit simultaneous adding actuations of a plurality of column-actuators; a series of column-actuators; an independent canceling device adapted to advance a plurality of the orders, at one movement, from diverse positions to a predetermined limit; and cancellation controlling means to operate said canceling device and effect a succeeding one-space adding movement of the series of column actuators; substantially as specified.

17. In a calculating machine, in combination: multiple-order accumulator mechanism, including carrying mechanisms adapted to permit simultaneous adding actuations of a plurality of column-actuators; a series of column-actuators; an independent canceling device adapted to advance a plurality of the orders from diverse positions to a predetermined limit; and cancellation controlling means to operate said canceling device and effect a prior and a succeeding adding movement of the series of column actuators; substantially as specified.

18. In a calculating machine, in combination: multiple-order accumulator mechanism, including carrying mechanisms adapted to permit simultaneous adding actuations of a plurality of column-actuators; a series of column-actuators; an independent canceling device adapted to advance a plurality of the orders from diverse positions to a predetermined limit; and cancellation controlling means to operate said canceling device and effect a prior and a succeeding one-space adding movement of the series of column actuators; substantially as specified.

19. In a calculating machine, in combination: multiple-order accumulator mechanism, including carrying mechanisms adapted to permit simultaneous adding actuations of a plurality of column-actuators; a series of column-actuators; an independent canceling device adapted to advance a plurality of the orders from diverse positions to a predetermined limit; and cancellation controlling means to operate said canceling device and effect a prior adding movement of the series of column actuators; substantially as specified.

20. In a calculating machine, in combination: multiple-order accumulator mechanism, including carrying mechanisms adapted to permit simultaneous adding actuations of a plurality of column-actuators; a series of column-actuators; an independent canceling device adapted to advance a plurality of the orders from diverse positions to a predetermined limit; and cancellation controlling means to operate said canceling device and effect a prior one-space adding movement of the series of column actuators; substantially as specified.

21. In a calculating machine, in combination: multiple-order accumulator mechanism, including carrying mechanisms adapted to permit simultaneous adding actuations of a plurality of column-actuators; a series of column-actuators; an independent canceling device adapted to advance a plurality of the orders, at one movement, from diverse positions to a predetermined limit; and cancellation controlling means to operate said canceling device and effect a prior and a succeeding adding movement of the series of column actuators; substantially as specified.

22. In a calculating machine, in combination: multiple-order accumulator mechanism, including carrying mechanisms adapted to permit simultaneous adding actuations of a plurality of column-actuators; a series of column-actuators; an independent canceling device adapted to advance a plurality of the orders, at one movement, from diverse positions to a predetermined limit; and cancellation controlling means to operate said canceling device and effect a prior and a succeeding one-space adding movement of the series of column actuators; substantially as specified.

23. In a calculating machine, in combination: multiple-order accumulator mechanism, including carrying mechanisms adapted to permit simultaneous adding actuations of a plurality of column-actuators; a series of column-actuators; an independent canceling device adapted to advance a plurality of the orders, at one movement, from diverse positions to a predetermined limit; and cancellation controlling means to operate said canceling device and effect a prior adding movement of the series of column actuators; substantially as specified.

24. In a calculating machine, in combination: multiple-order accumulator mechanism, including carrying mechanisms adapted to permit simultaneous adding actuations of a plurality of column-actuators; a series of column-actuators; an independent canceling device adapted to advance a plurality of the orders, at one movement, from diverse positions to a predetermined limit; and cancellation controlling means to operate said canceling device and effect a prior one-space adding movement of the series of column actuators; substantially as specified.

25. In a calculating machine, in combination: a series of column-actuators; multiple-order accumulator mechanism actuated thereby and including carrying mechanisms each adapted to store the power for a plurality of carrying and having latches to detain the carrying actuations of the accumulators until after any column-actuator actuations of the same accumulators; an independent canceling device adapted to advance a plurality of the orders from diverse positions to a predetermined limit; a releasing-bar for automatically releasing all of the said carrying latches simultaneously during the canceling operation; and cancellation controlling means to operate said canceling device and effect a succeeding adding movement of the series of column actuators; substantially as specified.

26. In a calculating machine, in combination: a series of column-actuators; multiple-order accumulator mechanism, actuated thereby and including carrying mechanisms each adapted to store the power for a plurality of carryings and having latches to detain the carrying actuations of the accumulators until after any column-actuator actuations of the same accumulators; an independent canceling device adapted to advance a plurality of the orders, at one movement, from diverse positions to a predetermined limit; a releasing-bar for automatically releasing all of the said carrying latches simultaneously during the canceling operation; and cancellation controlling means to operate said canceling device and effect a prior and a succeeding one-space adding movement of the series of column actuators; substantially as specified.

27. In a calculating machine, in combination: a series of column-actuators; multiple-order accumulator mechanism actuated thereby and including carrying mechanisms each adapted to store the power for a plurality of carryings and having latches to detain the carrying actuations of the accumulators until after any column-actuator actuations of the same accumulators; canceling mechanism; and a releasing-bar for automatically releasing all of the said carrying latches simultaneously during the canceling simultaneously; substantially as specified.

28. In a calculating machine, in combination: a series of column-actuators; multiple-order accumulator mechanism actuated thereby and including carrying mechanisms each adapted to store the power for a plurality of carryings and having latches to detain the carrying actuations of the accumulators until after any column-actuator actuations of the same accumulators; and a releasing-bar, with connections to operate it, for releasing all of the said carrying latches simultaneously; substantially as specified.

29. In a calculating machine, in combination: a series of column-actuators; multiple-order accumulator mechanism actuated thereby and including carrying mechanisms each adapted to store the power for a plurality of carryings and having latches to detain the carrying actuations of the accumulators until after any column-actuator actuations of the same accumulators; and a pivotally swinging releasing-bar, with connections to operate it, for releasing all of the said carrying latches simultaneously; substantially as specified.

30. In a calculating machine, in combination: a series of column-actuators; multiple-order accumulator mechanism actuated thereby and including carrying mechanisms each adapted to store the power for a plurality of carryings and having latches to detain the carrying actuations of the accumulators until after any column-actuator actuations of the same accumulators; canceling mechanism, including movable stop-levers to check the accumulators at a predetermined limit; and a separately mounted releasing-bar for automatically releasing all of the said carrying latches simultaneously during the canceling operation; substantially as specified.

31. In a calculating machine, in combination; a series of column-actuators; multiple-order accumulator mechanism actuated thereby and including carrying mechanisms each adapted to store the power for a plurality of carryings and having latches to detain the carrying actuations of the accumulators until after any column-actuator actuations of the same accumulators; canceling mechanism, including movable stop-levers to check the accumulators at a predetermined limit; and a separately pivoted releasing-bar for automatically releasing all of the said carrying latches simultaneously during the canceling operation; substantially as specified.

32. In a calculating machine, in combination: a series of column-actuators; multiple-order accumulator mechanism actuated thereby and including carrying mechanisms each adapted to store the power for a plurality of carryings and having latches to detain the carrying actuations of the accumulators until after any column-actuator actuations of the same accumulators; canceling mechanism, including movable stop-levers to check the accumulators at a predetermined limit; and a separately pivoted swinging releasing-bar for automatically releasing all of the said carrying latches simultaneously during the canceling operation; substantially as specified.

33. In a calculating machine, in combination: multiple-order accumulator mechanism, including a series of denominational wheels freely mounted on a shaft that is itself rotatable to advance a plurality of said wheels simultaneously; said rotatable shaft; a series of column-actuators; a canceling segment device engaging said rotatable shaft and adapted to advance a plurality of the orders from diverse positions to a predetermined limit; and cancellation controlling means to operate said canceling device and effect a succeeding adding movement of the series of column actuators; substantially as specified.

34. In a calculating machine, in combination: multiple-order accumulator mechanism, including a series of denominational wheels freely mounted on a notched shaft, coacting with pawls on said wheels, that is itself rotatable to advance a plurality of said wheels simultaneously; said rotatable shaft; a series of column-actuators; a canceling segment device engaging said rotatable shaft and adapted to advance a plurality of the orders from diverse positions to a predetermined limit; and cancellation controlling means to operate said canceling device and effect a succeeding adding movement of the series of column actuators; substantially as specified.

35. In a calculating machine, in combination: multiple-order accumulator mechanism, including accumulator gears meshing with a series of denominational wheels freely mounted on a shaft that is itself rotatable to advance a plurality of said wheels simultaneously; said rotatable shaft; a series of column-actuators; a canceling segment device engaging said rotatable shaft and adapted to advance a plurality of the orders from diverse positions to a predetermined limit; and cancellation controlling means to operate said canceling device and effect a succeeding adding movement of the series of column actuators; substantially as specified.

36. In a calculating machine, in combination: multiple-order accumulator mechanism, including accumulator gears and numeral wheels meshing with a series of intermediate gears freely mounted on a shaft that is itself rotatable to advance a plurality of said intermediate gears simultaneously; said intermediate gears and rotatable shaft; a series of column-actuators; a canceling segment device engaging said rotatable shaft and adapted to advance a plurality of the orders from diverse positions to a predetermined limit; and cancellation controlling means to operate said canceling device and effect a succeeding adding movement of the series of column actuators; substantially as specified.

37. In a calculating machine, in combination: multiple-order accumulator mechanism; a series of column-actuators; a transverse member for moving said column-actuators in unison during the canceling operation; an independent canceling device adapted to advance a plurality of the orders from diverse positions to a predetermined limit; and cancellation controlling means to operate said canceling device and effect a succeeding adding movement of the series of column-actuators; substantially as specified.

38. In a calculating machine, in combination: multiple-order accumulator mechanism; a series of column-actuators; an independent canceling device adapted to advance a plurality of the orders from diverse positions to a predetermined limit; stop-devices and connections to check the accumulator wheels at said limit; and cancellation controlling means to operate said canceling device and stop-device connections and effect a succeeding adding movement of the series of column actuators; substantially as specified.

39. In a calculating machine, in combination: multiple-order accumulator mechanism; a series of column-actuators; a transverse member for moving said column-actuators in unison during the canceling operation; an independent canceling device adapted to advance a plurality of the orders from diverse positions to a predetermined limit; stop-devices and connections to check the accumulator wheels at said limit; and cancellation controlling means to operate said canceling device and stop-device connections and effect a succeeding adding movement of the series of column actuators; substantially as specified.

40. In a calculating machine, in combination: multiple-order accumulator mechanism; a series of column-actuators; a transverse member for moving said column-actuators in unison during the canceling operation; an independent canceling device adapted to advance a plurality of the orders from diverse positions to a predetermined limit; and cancellation controlling cam-levers to operate said canceling device and effect a succeeding adding movement of the series of column-actuators; substantially as specified.

41. In a calculating machine, in combination: multiple-order accumulator mechanism; a series of column-actuators; an independent canceling device adapted to advance a plurality of the orders from diverse positions to a predetermined limit; stop-devices and connections to check the accumulator wheels at said limit; and cancellation controlling cam-levers to operate said canceling device and stop-device connections and effect a succeeding adding movement of the series of column actuators; substantially as specified.

42. In a calculating machine, in combination: multiple-order accumulator mechanism; a series of column-actuators; a transverse member for moving said column-actuators in unison during the canceling operation; an independent canceling device adapted to advance a plurality of the orders from diverse positions to a predetermined limit; stop-devices and connections to check the accumulator wheels at said limit; and cancellation controlling cam-levers to operate said canceling device and stop-device connections and effect a succeeding adding movement of the series of column actuators; substantially as specified.

43. In a calculating machine, in combination: multiple-order accumulator mechanism; a series of column-actuators; an independent canceling device adapted to advance a plurality of the orders from diverse positions to a predetermined limit; and cancellation controlling means to operate said canceling device and effect a separate adding movement of the series of column actuators; substantially as specified.

44. In a calculating machine, in combination: multiple-order accumulator mechanism, including carrying mechanisms adapted to permit simultaneously adding actuations of a plurality of common actuators; a series of column-actuators; an independent canceling device adapted to advance a plurality of the orders from diverse positions to a predetermined limit; and cancellation controlling means to operate said canceling device and effect a separate adding movement of the series of column actuators; substantially as specified.

In testimony whereof I have hereunto set my hand in the presence of two subscribing witnesses.

DORR E. FELT.

Witnesses:
HENRY LOVE CLARKE,
H. M. MUNDAY.

It is hereby certified that in Letters Patent No. 960,528, granted June 7, 1910, upon the application of Dorr E. Felt, of Chicago, Illinois, for an improvement in "Calculating-Machines," errors appear in the printed specification requiring correction, as follows: Page 3, line 115, the word "latch" should read *latches;* page 10, line 78, the word "carrying" should read *carryings*, and same page, line 124, the word "simultaneously" should read *operation*, and page 12, line 99, the word "common" should read *column;* and that the said Letters Patent should be read with these corrections therein that the same may conform to the record of the case in the Patent Office.

Signed and sealed this 23rd day of August, A. D., 1910.

[SEAL.]

F. A. TENNANT,
*Acting Commissioner of Patents.*